April 24, 1945.  S. L. GOOKIN  2,374,345
FASTENER INSERTING MACHINE
Filed May 23, 1942   2 Sheets-Sheet 2

INVENTOR:
Sylvester L. Gookin
by his attorney
Frederick L. Edmonds

Patented Apr. 24, 1945

2,374,345

UNITED STATES PATENT OFFICE 2,374,345

FASTENER INSERTING MACHINE

Sylvester L. Gookin, Quincy, Mass., assignor to United Shoe Machinery Corporation, Flemington, N. J., a corporation of New Jersey Application May 23, 1942, Serial No. 444,221

7 Claims. (Cl. 218—15)

This invention provides improvements in the hopper and raceway features of machines for attaching small articles to work-pieces.

Considering eyelets as such articles, one of the problems in eyeleting machines is to obtain precision of alignment of the delivery end of a raceway with an eyelet-inserting tool despite the motion by which the raceway is shifted to and from the path of that tool. A condition that militates against such precision commonly arises when one raceway is substituted for another, as when the same machine is used to attach eyelets of more than one size or type. Although interchangeable raceways are intended to conform to standards of length, curvature and other factors, careless handling and other causes do, in some cases, disturb their uniformity in those respects that affect the problem of alignment.

In the machine herein illustrated as embodying the improvements to be described, a spring is provided to shift the delivery end of a raceway into the path of the eyelet-inserting tool, but the motion away from that path is derived from an oscillatory face cam which, at one stage, establishes the delivering position of the raceway. One of the features of the invention is embodied in the means by which this cam is mounted with provision for effecting axial adjustment thereof to rectify, if need be, the delivering position of the raceway with respect to one limit of its travel.

Another feature of the invention is concerned with sidewise adjustment of the delivery end of the raceway to rectify misalignment with the eyelet-inserting tool. For this purpose the raceway is mounted on a supporting bracket and the latter is secured to the frame of the machine by a pivot stud and a clamping screw with provision for adjusting the bracket about the axis of the pivot stud.

Still another feature is concerned with the emission of articles from the hopper. Some types of articles are so shaped as to be capable of being nested one in another. This is true of some large and medium-sized eyelets, sometimes called grommets, designed for application to woven fabric such as canvas and webbing. The barrels of such eyelets are so tapered as to be nested, and many of them, when massed in a hopper, do become nested. Consequently, it frequently happens that the emission port of the raceway becomes obstructed by one eyelet stacked on another, with the result that all emission is stopped until the obstruction is removed.

The novel feature now under consideration includes a pusher so mounted and arranged in proximity to the emission port as not to obstruct the normal and orderly emission of articles one at a time, but to dislodge and repel two or more nested articles that may obstruct the port. A short movement of the pusher is sufficient, and manual operation thereof would serve the purpose when needed, but to relieve the operator from attention to this feature the illustrated machine is provided with means for operating the pusher whenever the eyelet-inserting tool is operated. The operating connections for this purpose also operate a member inside the hopper for feeding the articles toward the emission port.

Referring to the drawings.

Figure 1:
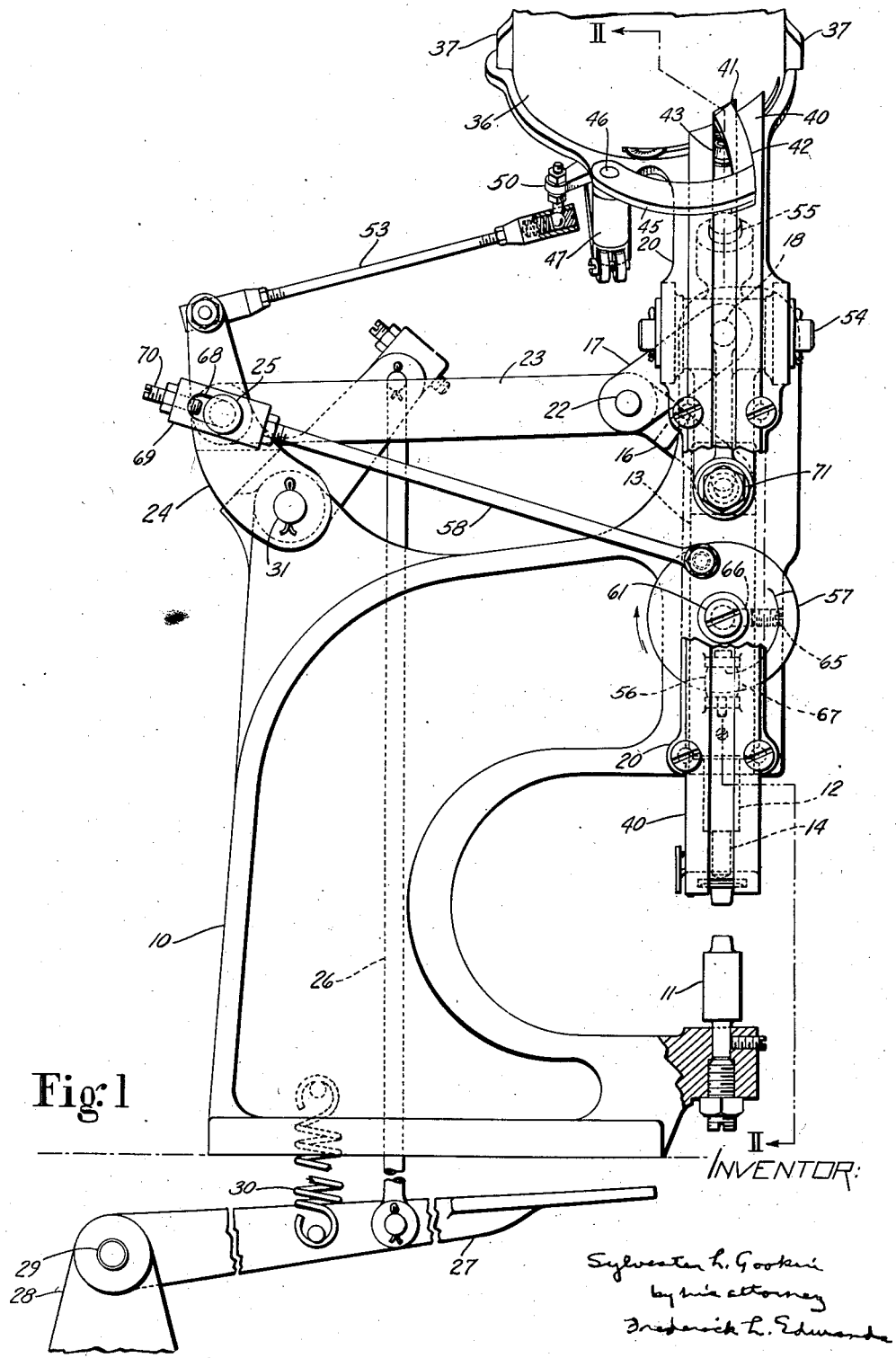
Fig. 1 is a side elevation, partly broken away, of an eyeleting machine embodying the invention.
Figure 2:
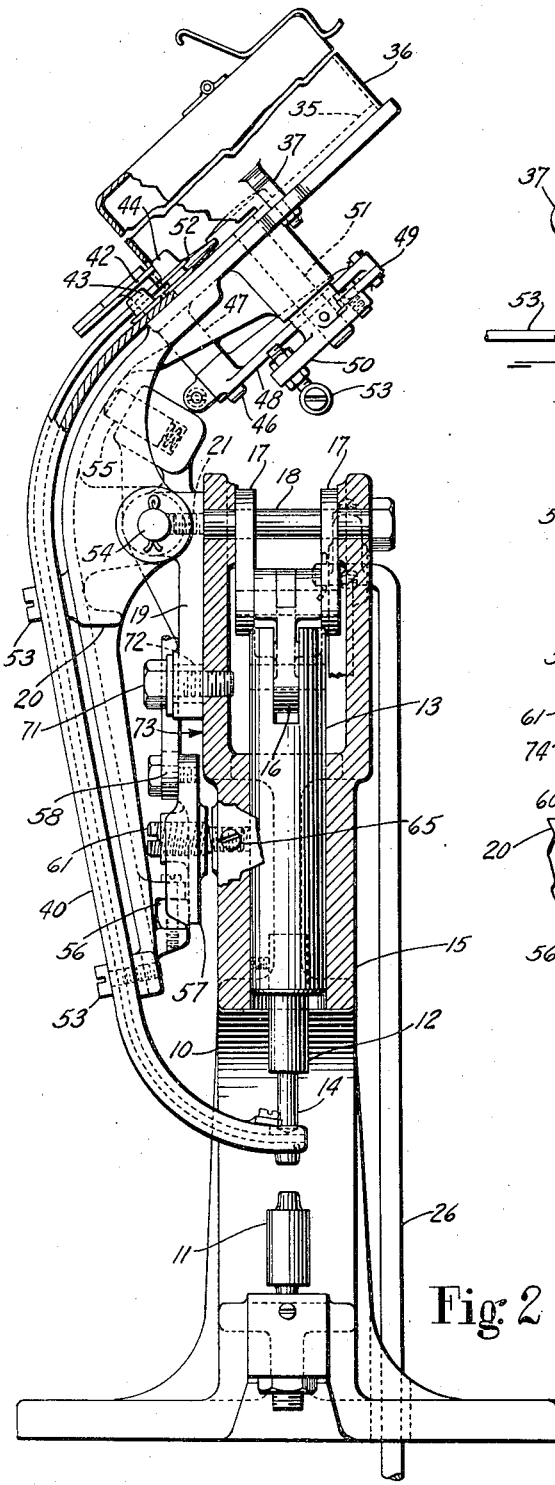
Fig. 2 is a front elevation partly in section as indicated by line II—II in Fig. 1.
Figure 3:
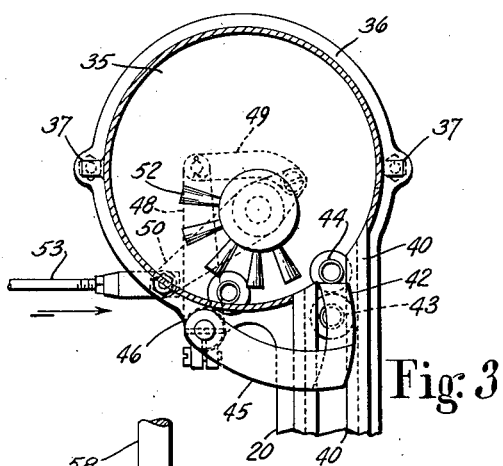
Fig. 3 is a sectional view of the hopper in an inclined plane but from the same side as Fig. 1.

Figs. 1 and 2 illustrate a foot-power eyeleting machine, the frame 10 of which is designed to be mounted on a bench. The lower eyelet-setting tool or anvil 11 is affixed to the frame but the eyelet-inserting tool 12 is affixed to a vertically movable plunger 13 and is provided with a spring-pressed spindle 14 adapted to pick eyelets from a raceway in well known manner. The plunger 13 is arranged to slide in a bearing portion 15 of the frame and is operated by a toggle comprising a lower link 16 and a pair of upper links 17. The links 17 are hung on an anchoring pivot 18 that extends through spaced confronting portions of the frame 10 and projects beyond one of them to support a bracket 19 on which the frame 20 of a hopper-and-raceway unit is mounted.

To provide for attaching the bracket 19 the latter is bored and tapped to receive a screw portion 21 of the anchoring pivot 18. The knee pivot 22 of the toggle extends through a link 23 and the rear end of this link is connected to a bell-crank lever 24 by a pivot pin 25. The bell-crank 24 is connected to the frame 10 by a fulcrum pin 31. A treadle rod 26 provides an operating connection between another arm of the bell-crank lever and an operating treadle 27 intended to be located near the floor and mounted in a floor bracket 28 to which it is connected by a fulcrum pin 29. A long tension spring 30 connected to the treadle exerts upward pull thereon to return the bell crank to the position shown.

The upper portion of the raceway frame 20 provides a flat inclined plate 35 of circular plan on which a cylindrical shell 36 is mounted to form a hopper, the plate 35 constituting the bottom wall of the hopper. Lugs 37 formed on the shell provide for securing the latter to the plate 35. An opening is cut in the side wall of the shell to receive the upper end of a detachable raceway 40 and the mid portion of this opening is extended heightwise to provide an emission port 41 only wide enough to permit the barrel of an eyelet to pass through it while the flange of the eyelet is correctly lodged in the raceway. An individual eyelet so lodged may gravitate in the raceway without encountering a pusher 42 which remains slightly above its path of travel. The eyelet indicated at 43 has been emitted from the hopper and may continue its downward travel in the raceway, but in the event that an eyelet such as that indicated at 44 is stacked upon the barrel of another eyelet it will encounter the pusher 42 and both of these eyelets will be arrested by the pusher while obstructing the port 41. A short movement of the pusher into the hopper will repel both of the nested eyelets from the port.

The pusher 42 is affixed to an arm 45 and the latter is provided with an operating arm 48, the two arms being connected by a rock-shaft 46 arranged to turn in a boss 47 formed on the plate 35. The arm 48 receives motion from a lever 50 to which it is connected by a link 49. The lever 50 is secured to the stem 51 of a brush 52 by which the eyelets may be fed toward the emission port 41. The lever 50 receives motion from the bell-crank 24 to which it is connected by a link 53. The pusher 42 and the brush 52 are thus operated whenever the treadle 27 is depressed and are so related that as the pusher repels the nested eyelets into the path of the brush, the latter carries them out of line with the port 41 and may, at the same time, separate them. While these results are being accomplished another portion of the brush may carry an individual eyelet to the port.

The raceway 40 is secured to the frame 20 by screws 53 and may be detached therefrom to permit another raceway to be substituted for it. The frame 20 and the supporting bracket 19 are connected by a pivot pin 54 about which the raceway unit may oscillate. A spring-pressed follower 55 arranged in a socket in the bracket 19 bears against the frame 20 to move the delivery end of the raceway into the path of the tool 12. A roll 56 carried by the frame 20 is thus maintained against a face cam 57 which receives oscillatory motion from the bell-crank 24 through the medium of a rod 58.

Figure 4:
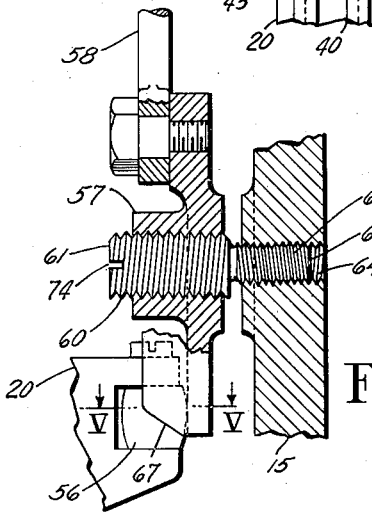
Fig. 4 is a front view partly in section including the raceway cam and its mounting.

The invention includes improved means for mounting the cam 57 and providing axial adjustment thereof for the purpose of insuring accurate cooperation of the delivery end of the raceway with the spindle 14. As shown in Fig. 4 the hub of the cam is provided with an internal screw thread that cooperates with a corresponding screw thread 60 formed on a stud or stem 61. The shank 62 of this stem is provided with a screw thread 63 and is screwed into a tapped socket 64 in the bearing portion 15 of the frame 10. A plug 66 of relatively soft material such as copper or compressed fiber is arranged to be driven against the shank 62 by a set screw 65 to bind the stem after the desired adjustment has been made. A slot 74 in the outer end of the stem is adapted to receive a slender instrumentality such as a pin or screw driver by which the stem may be turned.

The screw threads 60 and 63 are of opposite pitch or lead although it would be within the scope of the broad principles of such a mounting to omit the thread 63 and the corresponding thread of the socket 64. The essential consideration with respect to the connection between the cam and the stem is that the cam may be adjusted lengthwise of its axis in consequence of imparting rotational adjustment to the stem. Nevertheless, when the shank portion 62 and the socket 64 are provided with threads opposed to the thread 60 their adjusting effect supplements that of the thread 60 to shift the cam. If the shank 62 and the socket 64 be not provided with screw threads the stem need only be capable of being rotated in the socket, secured against accidental rotation, and maintained against axial movement to the right while undergoing rotational adjustment.

Figure 5:
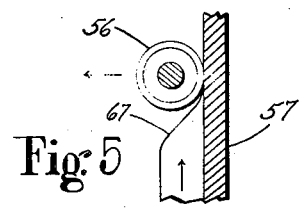
Fig. 5 is a development of the raceway cam and its follower.

The screw connection between the cam and the stem constitutes a thrust bearing and avoids the need of other means to maintain these parts in assembled relation. Only a face cam is capable of utilizing the benefits of this type of mounting. The inclined portion 67 of the cam 57 (Fig. 5) does not take effect until the spindle 14 has entered an eyelet far enough to insure that the eyelet will remain thereon when the raceway is retracted from the path of the tool 12. To insure the necessary lag in the timing of the return strokes of the raceway with respect to the return strokes of the tool 12, the rod 58 (Fig. 1) and the bell crank 24 are connected by a lost motion connection. For this purpose the stud 25 extends through a slot 68 in a connecting piece 69 screwed on the rod 58. A screw 70 is carried by the piece 69 in a position to abut the stud 25 while the bell-crank lever 24 returns to its initial position after operating the tool 12.

If the delivery end of the raceway requires sidewise adjustment to rectify its relation to the spindle 14, such adjustment may be obtained by slight angular motion of the bracket 19 about the axis of the stud 18. When this adjustment has been obtained, the bracket may be clamped against a flat face 70 of the frame 10 by a screw 71. An oversize hole 72 formed in the bracket to receive the clamping screw affords a sufficient range of adjustment.

Considering the direction of turning movement of the cam (indicated by an arrow in Fig. 1) required to displace the raceway from the path of the tool 12, the thread 60 and the corresponding thread in the cam are left-hand. Consequently, the cam itself receives a component of axial movement in the same direction as the delivery end of the raceway, and to this extent it accelerates the effect of the inclined portion 67 of the cam and permits that portion to be less steep than it would otherwise have to be to clear the path of the tool.

When the treadle is depressed the spindle 14 immediately enters an eyelet, the inclined portion 67 of the cam (Fig. 5) next displaces the roll 56 to the left, thereby retracting the raceway, and the tool 12 inserts and clenches the eyelet. When the bell crank 24 starts its return stroke the pin 25 carried thereby moves a short distance in the slot 68 (Fig. 1) before engaging the screw 70, the lost motion thus provided producing a lag in the return motion of the cam 57, but when the spindle 14 has risen far enough to clear the eyelet then at the delivery end of the raceway the inclined portion 67 of the cam, now engaging the roll 56, is kicked ahead by the pressure of the roll derived from the follower 55 (Fig. 2). At this stage the cam completes the return stroke of the rod 58 and restores the lost motion elements to their initial relation shown in Fig. 1.

Having described my invention, what I claim as new and desire to secure by Letters Patent of the United States is:

1. A fastener-inserting machine comprising a plunger, a fastener-inserting tool carried thereby, means for operating the plunger, a raceway movable to and from the path of said tool, a face cam for displacing the raceway from said path, a stationary pivot on which said cam is mounted, and means for oscillating the cam about said pivot, the cam and the pivot having cooperative screw threads constituting a thrust bearing.

2. A fastener-inserting machine comprising a plunger, a fastener-inserting tool carried thereby, means for operating the plunger, a raceway movable to and from the path of said tool, a face cam for displacing the raceway from said path, a pivot on which said cam is mounted, a frame member having a socket in which a portion of said pivot has a bearing and is adjustable, means for securing the pivot to said frame member in various positions of adjustment, and means for oscillating said cam about said pivot, the cam and the pivot having cooperative screw threads constituting a thrust bearing.

3. A fastener-insering machine comprising a plunger, a fastener-inserting tool carried thereby, means for operating the plunger, a raceway movable to and from the path of said tool, a face cam for displacing the raceway from said path, a pivot on which said cam is mounted, a frame member having a socket, said pivot and said socket having cooperative screw threads, means for securing said pivot in various positions of adjustment in said socket, and means for oscillating said cam about said pivot, the cam and the pivot having cooperative screw threads constituting a thrust bearing.

4. A fastener-inserting machine comprising a plunger, a fastener-inserting tool carried thereby, means for operating the plunger, a raceway movable to and from the path of said tool, a face cam for displacing the raceway from said path, a stationary pivot on which the cam is mounted, and means for oscillating the cam about said pivot, the cam and the pivot having cooperative surfaces arranged to produce a component of axial movement of the cam.

5. An eyeleting machine comprising a eyelet-inserting tool provided with a spindle, means for reciprocating said tool, a frame in which said elements are mounted, an eyelet raceway arranged to cooperate with said spindle, said frame having a socket, a stem having a shank portion in said socket and a bearing portion projecting therefrom, friction means engaging said shank portion to hold the stem against accidental turning, and raceway operating mechanism including an oscillatory face cam arranged on the bearing portion of said stem, the cam and the stem having cooperative screw threads by which the cam may be adjusted axially in consequence of adjusting the stem rotationally.

6. An eyeleting machine comprising eyelet-inserting mechanism including a toggle and a reciprocatory setting tool provided with a spindle, a frame in which said mechanism is mounted and to which said toggle is connected by a stationary pivot stud, a supporting member detachably secured to said frame by said pivot stud, an oscillatory raceway for eyelets mounted on said supporting member and pivotally connected thereto, and means for operating said raceway, said supporting member being angularly adjustable about the axis of said stud to align the delivery end of the raceway with said spindle.

7. An eyeleting machine comprising eyelet-inserting mechanism including a reciprocatory setting tool provided with a spindle, a frame in which said mechanism is mounted, an eyelet-raceway, a supporting bracket therefor, a pivot pin connecting the raceway and said bracket, means by which said bracket is rigidly secured to a flat face of said frame parallel with the axis of said pivot pin, and mechanism for oscillating the raceway about said axis, said securing means including a pivot member at righ angles to and intersecting said flat face to afford widthwise adjustment of the delivery end of the raceway.

SYLVESTER L. GOOKIN.